United States Patent
Chhabra

(10) Patent No.: US 10,585,996 B2
(45) Date of Patent: Mar. 10, 2020

(54) DIE RESISTANCE-CAPACITANCE EXTRACTION AND VALIDATION

(71) Applicant: SEAGATE TECHNOLOGY LLC, Cupertino, CA (US)

(72) Inventor: Nitin Kumar Chhabra, Maharashtra (IN)

(73) Assignee: Seagate Technology LLC, Cupertino, CA (US)

( * ) Notice: Subject to any disclaimer, the term of this patent is extended or adjusted under 35 U.S.C. 154(b) by 75 days.

(21) Appl. No.: 15/869,542

(22) Filed: Jan. 12, 2018

(65) Prior Publication Data

US 2019/0220560 A1    Jul. 18, 2019

(51) Int. Cl.
*G06F 17/50* (2006.01)
*G01R 21/133* (2006.01)

(52) U.S. Cl.
CPC ....... *G06F 17/5031* (2013.01); *G01R 21/133* (2013.01); *G06F 17/5036* (2013.01); *G06F 17/5081* (2013.01); *G06F 2217/78* (2013.01); *G06F 2217/84* (2013.01)

(58) Field of Classification Search
USPC .......................................................... 716/113
See application file for complete search history.

(56) References Cited

U.S. PATENT DOCUMENTS

| | | |
|---|---|---|
| 7,174,520 B2 | 2/2007 | White et al. |
| 7,784,019 B1 | 8/2010 | Zach |
| 2008/0216038 A1 | 9/2008 | Bose |
| 2014/0074449 A1* | 3/2014 | Turner ................ G06F 17/5036 703/14 |
| 2017/0045557 A1* | 2/2017 | Kawa .................. G06F 17/5036 |

* cited by examiner

*Primary Examiner* — Bryce M Aisaka
(74) *Attorney, Agent, or Firm* — Kagan Binder, PLLC

(57) ABSTRACT

Systems and methods for die resistance-capacitance (RC) extraction and validation are described. In one embodiment, the method includes generating a chip power model (CPM) based at least in part on single domain excitation to determine a die capacitance; and performing loop-based static IR drop analysis to determine a die resistance for each power domain of a die. In some cases, the generating of the chip power model (CPM) includes generating a separate CPM for each power domain of the die.

20 Claims, 9 Drawing Sheets

DIE RESISTANCE-CAPACITANCE EXTRACTION AND VALIDATION

SUMMARY

The present disclosure is directed to methods and systems for die resistance-capacitance (RC) extraction and validation. In some embodiments, the present systems and methods may create a lumped model of an integrated circuit (IC) die. In some embodiments, the present systems and methods may model an IC die in a lumped resistor-capacitor (RC) format and validate the model using various flows. In some cases, the present systems and methods may include fine tuning of a voltage regulator module (VRM) associated with the IC die.

A method for die resistance-capacitance (RC) extraction and validation is also described. In one embodiment, the method may include generating a chip power model (CPM) based at least in part on single domain excitation to determine a die capacitance; and performing loop-based static IR drop analysis to determine a die resistance for each power domain of a die. In some cases, the generating of the chip power model (CPM) may include generating a separate CPM for each power domain of the die.

In some cases, generating a separate CPM for each power domain of the die includes generating a first CPM based at least in part on applying a first excitation source between a first power domain of the die and a ground domain of the die, and generating a second CPM based at least in part on applying a second excitation source between a second power domain of the die and the ground domain of the die.

In some embodiments, the method may include determining a first die capacitance between the first power domain and the ground domain based at least in part on the first CPM and determining a second die capacitance between the second power domain and the ground domain based at least in part on the second CPM.

In some cases, determining the first die capacitance may be based at least in part on performing dynamic analysis of the applying of the first excitation source between the first power domain of the die and the ground domain of the die. In some embodiments, the method may include applying a voltage to a first loop between a first power domain of the die and a ground domain of the die and applying the voltage to a second loop between a second power domain of the die and the ground domain of the die.

In some embodiments, the method may include determining how many non-switching instances of the first loop experience a voltage drop of a first voltage value. In some embodiments, the method may include determining how many non-switching instances of the second loop experience a voltage drop of the second voltage value.

In some embodiments, the method may include determining a first product of the number of non-switching instances of the first loop experiencing a voltage drop of the first voltage value multiplied by the respective first voltage drop values. In some embodiments, the method may include determining a second product of the number of non-switching instances of the second loop experiencing a voltage drop of the second voltage value multiplied by the respective second voltage drop values.

In some embodiments, the method may include determining a mean voltage drop of the first loop by determining a first sum of the first product, determining a second sum of the number of non-switching instances of the first loop experiencing a voltage drop of the first voltage, and dividing the first sum by the second sum.

In some embodiments, the method may include determining a total current of the first loop by dividing the average power associated with the applied voltage by an applied voltage. In some embodiments, the method may include determining a die resistance of the first loop by dividing the mean voltage drop of the first loop by the total current of the first loop.

In some embodiments, the method may include determining whether the die resistance of the first loop matches a predetermined static drop range. In some embodiments, upon determining the computed die resistance of the first loop matches the predetermined static drop range, the method may include indicating the die resistance of the first loop is validated.

In some embodiments, the method may include determining a mean voltage drop of the second loop by determining a third sum of the second product determining a fourth sum of the number of non-switching instances of the second loop experiencing a voltage drop of the second voltage, and dividing the third sum by the fourth sum.

In some embodiments, the method may include determining a total current of the second loop by dividing the average power associated with the applied voltage by an applied voltage. In some embodiments, the method may include determining a die resistance of the second loop by dividing the mean voltage drop of the second loop by the total current of the second loop.

In some embodiments, the method may include determining whether the die resistance of the second loop matches a predetermined static drop range. In some embodiments, the method may include upon determining the computed die resistance of the second loop matches the predetermined static drop range, indicating the die resistance of the second loop is validated.

As one example, a first voltage is applied to a first loop. In some cases, the first loop may refer to a first voltage domain. In the example, nsa1 instances experience a drop of da1, nsa2 instances experience a drop of da2, and so on until nsaN instances experience a drop of daN. In one embodiment, the present systems and methods will generate a matrix of N rows and two columns. In one embodiment, the first column represents the number of instances and the second column represents the respective voltage drop values per number of instances.

In one embodiment, the first product may be a single column matrix made by multiplying the two columns of above N*2 matrix (e.g., nsa1*da1, nsa2*da2, . . . nsaN*daN). In the example, a first sum may be a sum of the first products (nsa1*da1+nsa2*da2+ . . . nsaN*daN), which results in a single value. A second sum may be a sum of instances (nsa1+nsa2+ . . . nsaN) which is again single value and represents the total instances for the first loop.

In one embodiment, a mean voltage drop of the first loop is equal to the first sum divided by the second sum, resulting in a single value for the mean voltage drop. In one embodiment, an average current of the first loop may be determined by calculating the average power of the first loop divided by the first voltage. In one embodiment, a die resistance of the first loop may be equal to the mean voltage drop of the first loop divided by the average current of the first loop.

In one embodiment, a second loop is independent of the first loop. In one embodiment, the calculation for die resistance of the first loop ends here and is not connected with or a factor of calculations for a second loop. In a given die, there can be multiple loops, such as the first loop and the second loop. In one embodiment, the number of loops in a die is determined by the number of power domains in the die. For example, the first loop may be a loop of a first power domain, the second loop of a second power domain, and so forth. In one embodiment, determining certain aspects of the second loop (e.g., mean voltage drop of the second loop, average current of the second loop, die resistance of the second loop, etc.) may be determined the same way they were determined for the first loop as described above.

An apparatus for die resistance-capacitance (RC) extraction and validation, the apparatus is also described. In one embodiment, the storage system device may include one or more processors, memory in electronic communication with the one or more processors, and instructions stored in the memory. In some embodiments, the instructions may be executable by the one or more processors to perform the steps of generating a chip power model (CPM) based at least in part on single domain excitation to determine a die capacitance; and performing loop-based static IR drop analysis to determine a die resistance for each power domain of a die. In some cases, the generating of the chip power model (CPM) may include generating a separate CPM for each power domain of the die.

A computer-program product for die resistance-capacitance (RC) extraction and validation is also described. In some cases, the computer-program product may include a non-transitory computer-readable medium storing instructions thereon. In one embodiment, the instructions may be executable by a processor to perform the steps of generating a chip power model (CPM) based at least in part on single domain excitation to determine a die capacitance; and performing loop-based static IR drop analysis to determine a die resistance for each power domain of a die. In some cases, the generating of the chip power model (CPM) may include generating a separate CPM for each power domain of the die.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
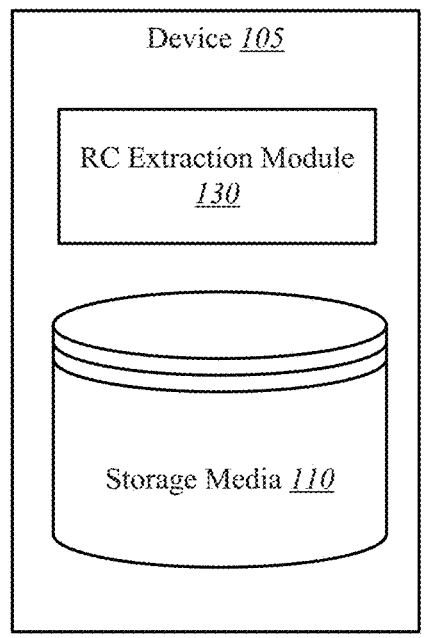
FIG. 1 is a block diagram of an example of a system in accordance with various embodiments.

The following relates generally to die resistance-capacitance (RC) extraction and validation. In one embodiment, the present systems and methods may create a lumped model of an integrated circuit (IC) die. In some embodiments, the present systems and methods may model an IC die in a lumped resistor-capacitor (RC) format and validate the model using various flows. In some cases, the present systems and methods may include fine tuning of a voltage regulator module (VRM) associated with the IC die.

IC macros were the first complete function built into an IC chip. Starting in the early 1960s, IC macros provided a circuit as simple as an AND gate, a register or a flip-flop. By the 1970s, IC macros became more complex. Subsequently, IC macros became the "glue logic" that ties together microprocessors and other subsystem chips.

Traditionally, NAND gates are one of the two basic logic gates (the other being NOR logic) from which any other logic gates can be built. Due to this property, NAND and NOR gates have been referred to as "universal gates." However, modern integrated circuits may not be constructed exclusively from a single type of gate. Instead, electronic design automation (EDA) tools may be used to convert the description of a logical circuit to a netlist of complex gates (standard cells) or transistors.

In semiconductor design, standard cell methodology is a method of designing very-large-scale integration (VLSI) semiconductor technologies such as application-specific integrated circuits (ASICs), field-programmable gate arrays (FPGAs), and complex programmable logic devices (CPLDs). Standard cell methodology is an example of design abstraction, whereby a low-level very-large-scale integration (VLSI) layout is encapsulated into an abstract logic representation (such as a NAND gate). A programmable ASIC may contain multiple types of input/output cells (I/O cells). These cells may handle driving logic signals off-chips, receiving and conditioning external inputs, as well as handling such things as electrostatic protection. The I/O cells may include at least one of a direct current (DC) output, an alternating current (AC) output, a DC input, an AC input, a clock input, and a power input. A DC output may be used to drive a resistive load at DC or low frequency. An AC output may be used to drive a capacitive load with a high speed logic signal off chip. Example sources of a DC input may include a switch, sensor, or another logic chip. An example source of an AC input may include high speed logic signals from another chip. The clock input may include system clocks or signals on a synchronous bus. The power input may provide power to the I/O cells and the logic in the core of the die or chip. It is noted that the terms "chip" and "die" may be used interchangeably herein.

The power supply in a chip may be distributed uniformly through metal layers (Vdd and Vss, for example) across a given design. These metal layers have a finite amount of resistance. When voltage is applied to a metal layer, current begins flowing through the metal layer and some voltage is dropped due to resistance electrons experience as they flow through the metal. This drop of voltage may be referred to as voltage drop or IR drop.

IR drop is a signal integrity (SI) effect caused by wire resistance and current drawn off from Power (Vdd) and Ground (Vss) grids. According to Ohm's law, V=IR. If wire resistance is too high or the current passing through the metal layers is larger than predicted, an unacceptable voltage drop may occur. Due to the voltage drop, the power supply voltage decreases, which may result in the required power across the design not reaching the cells, which can result in increased noise susceptibility and poor performance. As one example, a design configured to operate at 2 volts with a tolerance of 0.4 volts on either side means that the voltage across a power pin (Vdd) and a ground pin (Vss) will be reliable as long as this voltage does not fall below 1.6 volts. Thus, the acceptable IR drop in this example is 0.4 volts or less. As long as the voltage does not drop below is 0.4 volts or less, the timing and functionality of the design should be reliable.

A design may have different types of gates with different voltage levels. As the voltage at gates decreases due to IR drop in the supply voltage, the gate delays may increase non-linearly. Gate delay increases may lead to setup time and hold time violations depending on the path these gates are associated with in the design.

The technology node (also known as process node, process technology, or node) refers to a specific semiconductor manufacturing process and its design rules. Different nodes often imply different circuit generations and architectures. Generally, the smaller the technology node means the smaller the feature size, producing smaller transistors which are both faster and more power-efficient. As the technology node shrinks, there is a decrease in the geometries of the metal layers and the resistance of this metal layer increases, which results in a decrease in power supply voltage. The voltage drop on the buffers and inverters of a clock path may cause the delay in the arrival of a clock signal, resulting in a hold violation.

For voltage budgeting and fine tuning of a voltage regulator module (VRM), a lumped model of a die or chip is recommended along with a model for the PCB and package. Board and package parasitic resistance, inductance, conductance, capacitance (RLGC) may be extracted. The present systems and methods model an IC die in a lumped RC format and validate the model using different flows, resulting in a fine tuning of the associated voltage regulator module (VRM).

Copper has the second lowest electrical resistance of all metals at 17 billionths of an Ohm per cubic meter. Although a small figure, this translates to significant resistances for the thin copper foils used in PCBs, which can be from 9 to 35 μm thick. When current starts flowing in the copper foils that make up our power delivery networks (PDNs), this finite resistance has two detrimental impacts in the form of IR drop and increased temperature rise.

Static IR drop describes the DC voltage that develops across a conductor as a result of its electrical resistance. This voltage is proportional to the current that flows though the conductor based on Ohm's law (V=I×R) and results in a drop in voltage available at the load devices (Vload=Vsupply−Vdrop). In static IR drop analysis, a user may select one or more sources (e.g., BGA bumps, a particular power domain, etc.) and one or more sinks (e.g., standard cells, a particular ground domain, etc.) for a given current and then run an analysis on all nets of concern to determine the respective voltage drop. Static IR drop is the drop in Vdd voltage level caused by the resistance of the metal wires comprising the power distribution. In other words, IR drop is a voltage drop due to current flowing through the interconnect lines when the circuit is at a steady state, (i.e., when no I/Os are switching). In one embodiment, static IR drop analysis approximates the transistor or cell-switching current as a constant or DC current source attached to the power grids, which are modeled and extracted as purely resistive networks.

As silicon process geometries have reduced in scale over the years, so too have their operating voltages and noise margins. However, the power demands of many devices have not scaled accordingly and so power-hungry devices, whilst operating at relatively low voltages, can draw considerable current. For a given power plane, a larger current can result in a greater IR drop voltage, and thus a lower voltage available at the load. Such voltage drops can cause problems when distributing power across a PCB. When the drop becomes excessive, the voltage at the load may fail to meet necessary device specifications.

In one embodiment, extraction of die capacitance (C) may be achieved using a chip power model (CPM) with single domain excitation, where C is a function of an operating frequency associated with the die. In some cases, C may be estimated using dynamic analysis. Timing analysis may be static or dynamic. Dynamic timing analysis verifies functionality of the design by applying input vectors and checking for correct output vectors. Static timing analysis checks static delay requirements of the circuit without any input or output vectors. Dynamic IR drop is the drop when the high current draws the power network due to the high switching of the cell data. Dynamic IR drop analysis may include vector-based power analysis with worst-case switching currents. Dynamic voltage drop, unlike the static voltage drop depends on the switching activity of the design, and hence it may be vector dependent. Typically, a circuit does not draw constant current. For example, current draw increases when a cell is switching. When a group of cells is switching at the same time, it draws a lot of current at that moment in time. Dynamic analysis may include analysis of the voltage drop of current surges associated with a group of cells switching at the same time.

In one embodiment, the CPM model may include two ASCII files, one corresponding to die parasitic, and another corresponding to a transient current profile. In some cases, an excitation source may be applied between one power domain and ground. In some cases, AC analysis of the excitation source applied between one power domain and ground may be used to extract the die capacitance value between the power domain and ground. In some embodiments, the excitation source may include a voltage excitation source, and/or a current excitation source.

In one embodiment, extraction of die resistance (R) may be done using loop-based static IR drop analysis. In some cases, IR drop analysis may measure how much voltage drop occurs in the power supply due to parasitic resistance and the current flowing through the power (VDD). In some cases, DC/static extraction may be better suited for extracting R. In one embodiment, the static drop analysis may provide the return path of the current associated with the analysis. In some cases, the extracted value for R is validated when R matches the static drop range. In some cases, static IR drop analysis may include a first-order approximation. In some cases, IR drop analysis may use the total power dissipation to calculate a constant current draw. In some cases, static IR drop is the voltage drop when a constant current draws through the power network with varying resistance. This IR drop may occur when the circuit is in steady state. Static drop analysis may be performed without introducing a waveform and may be based on statistical annotations of toggle count, whereas dynamic analysis may be based on analysis of a waveform. In some cases, static IR drop analysis may be vectorless power analysis with average current cycles In some cases, using loop-based static drop analysis provides an effective ground resistance instead of the complete ground resistance, where the effective ground resistance is more realistic to actual conditions. In some cases, a separate resistance of power and ground may be extracted. In some cases, a mean value of IR drop may be computed based on the histogram of each domain (e.g., VCORE1 power domain, VCORE2 power domain, VSS ground domain, etc.). In some cases, the static drop analysis may be performed based on a known power and/or voltage values. In some cases, a mean current may be computed based on the known power and voltage values, where current is equal to power divided by voltage. In one embodiment, the equivalent resistance may be computed from the mean current and the mean voltage drop based on Ohm's law, where resistance equals voltage divided by current.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include resistance-capacitance (RC) extraction module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. In some embodiments, RC extraction module 130 may perform one or more operation associated with die resistance-capacitance (RC) extraction and validation. In some embodiments, RC extraction module 130 may create a lumped model of an integrated circuit (IC) die. In some embodiments, RC extraction module 130 may model an IC die in a lumped resistor-capacitor (RC) format and validate the model using various flows. In some cases, RC extraction module 130 may include fine tuning of a voltage regulator module (VRM) associated with the IC die.

Figure 2:
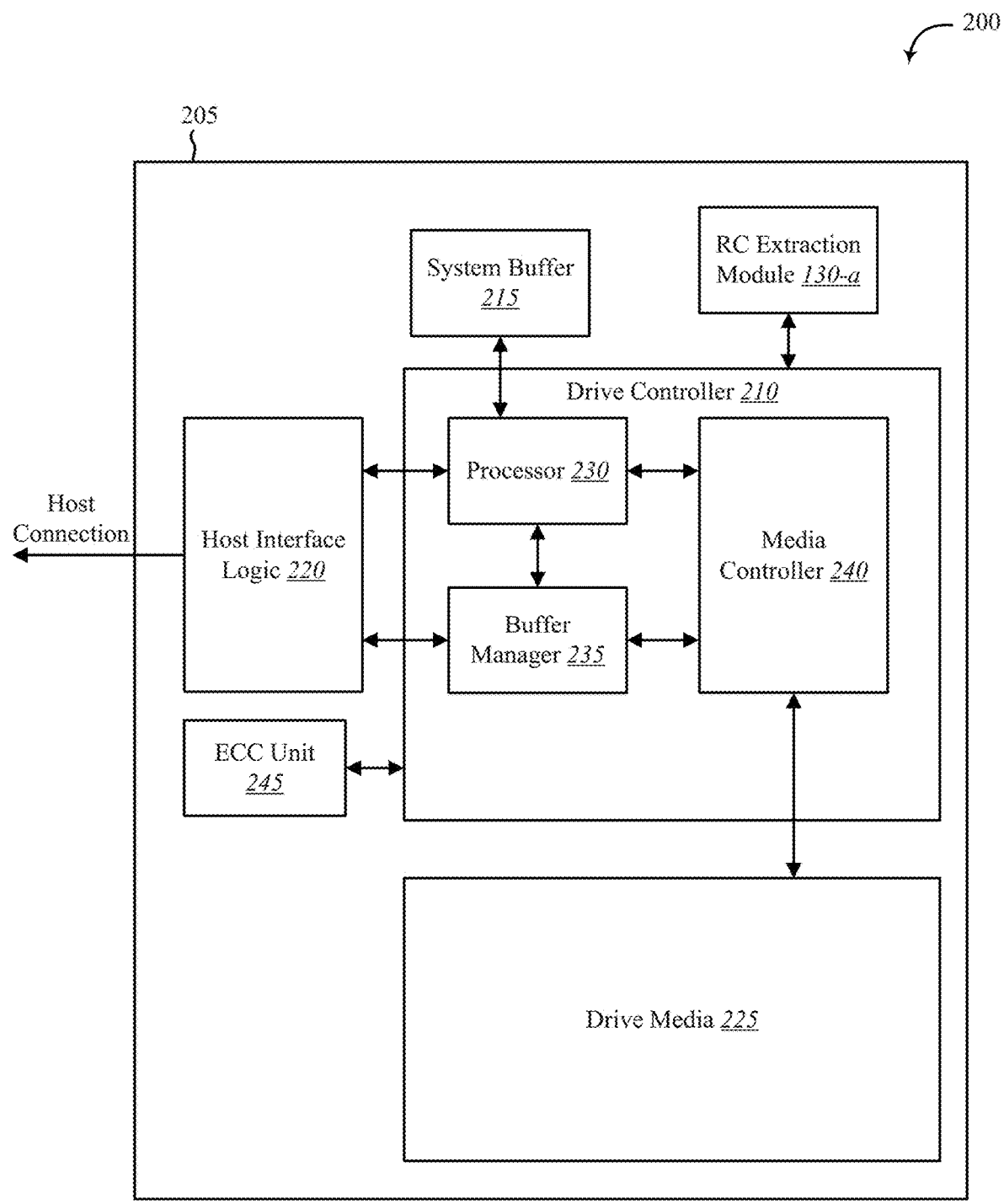
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and RC extraction module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, RC extraction module 130-*a* may include at least one of one or more processors, one or more memory devices, one or more storage devices, instructions executable by one or more processors stored in one or more memory devices and/or storage devices, or any combination thereof. Although depicted outside of drive controller 210, in some embodiments, RC extraction module 130-*a* may include software, firmware, and/or hardware located within drive controller 210 and/or operated in conjunction with drive controller 210. For example, RC extraction module 130-*a* may include at least a portion of processor 230, buffer manager 235, and/or media controller 240. In one example, RC extraction module 130-*a* may include one or more instructions executed by processor 230, buffer manager 235, and/or media controller 240.

Figure 3:
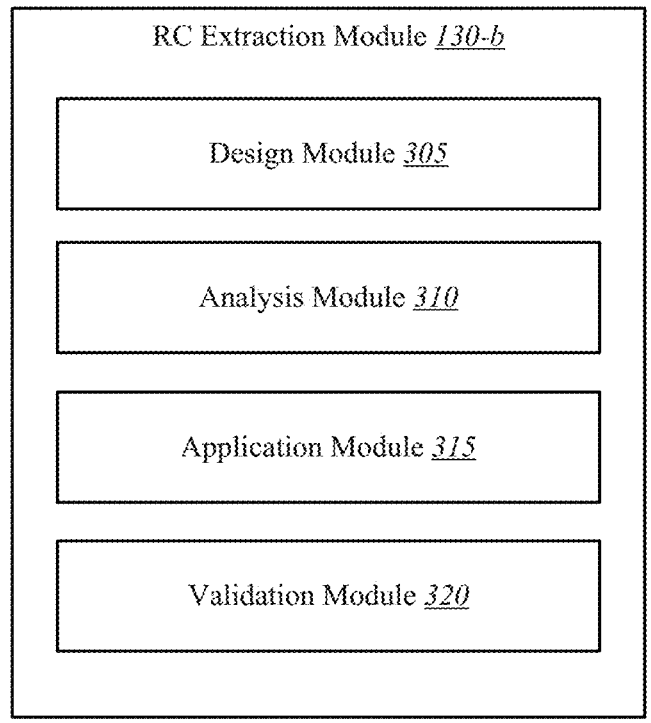
FIG. 3 shows a block diagram of one or more modules in accordance with various aspects of this disclosure.

FIG. 3 shows a block diagram of RC extraction module 130-*b*. The RC extraction module 130-*b* may include one or more processors, memory, and/or one or more storage devices. The RC extraction module 130-*b* may include design module 305, analysis module 310, application module 315, and validation module 320. The RC extraction module 130-*b* may be one example of RC extraction module 130 of FIGS. 1 and/or 2. Each of these components may be in communication with each other.

In one embodiment, RC extraction module 130-*b* may perform one or more operations associated with die resistor-capacitor (RC) extraction and validation. In one example, RC extraction module 130-*b* may create a lumped model of an integrated circuit (IC) die. In some embodiments, RC extraction module 130-*b* may model an IC die as a simple lumped RC format and validate the model using various flows. In some cases, RC extraction module 130-*b* may perform one or more operations in association with fine tuning a voltage regulator module (VRM) associated with the IC die.

In one embodiment, design module 305 may be configured to generate a chip power model (CPM) in conjunction with the creation of the lumped model of the IC die. In some cases, design module 305 may be configured to generate the CPM based at least in part on single domain excitation to determine a die capacitance.

In some cases, the generating of the chip power model (CPM) may include generating a separate CPM for each power domain of the die. In some cases, the generating of a separate CPM for each power domain of the die may include generating a first CPM based at least in part on applying a first excitation source between a first power domain of the die and a ground domain of the die, and generating a second CPM based at least in part on applying a second excitation source between a second power domain of the die and the ground domain of the die.

In one embodiment, analysis module 310 may be configured to perform loop-based static IR drop analysis to determine a die resistance for each power domain of a die. In some embodiments, analysis module 310 may determine a first die capacitance between the first power domain and the ground domain based at least in part on the first CPM. In one embodiment, analysis module 310 may determine a second die capacitance between the second power domain and the ground domain based at least in part on the second CPM.

In some cases, determining the first die capacitance may be based at least in part on performing dynamic analysis of the applying of the first excitation source between the first power domain of the die and the ground domain of the die. In some examples, determining the second die capacitance may be based at least in part on performing dynamic analysis of the applying of the second excitation source between the second power domain of the die and the ground domain of the die.

In one embodiment, application module 315, in conjunction with analysis module 310, may be configured to apply a voltage to a first loop between a first power domain of the die and a ground domain of the die. In some examples, application module 315, in conjunction with analysis module 310, may be configured to apply the voltage to a second loop between a second power domain of the die and the ground domain of the die.

In some embodiments, analysis module 310 may determine how many non-switching instances of the first loop experience a voltage drop of a first voltage value. Additionally or alternatively, analysis module 310 may determine how many non-switching instances of the second loop experience a voltage drop of the second voltage value. Although reference is made herein to just a voltage drop of a first voltage value and a voltage drop of a second voltage value, it is understood that the present systems and methods apply equally to two or more voltage drop values.

In some embodiments, analysis module 310 may determine a first product of the number of non-switching instances of the first loop experiencing a voltage drop of the first voltage value multiplied by the respective first voltage drop values. Additionally or alternatively, analysis module 310 may determine a second product of the number of non-switching instances of the second loop experiencing a voltage drop of the second voltage value multiplied by the respective second voltage drop values.

In some embodiments, analysis module 310 may determine a mean voltage drop of the first loop. In some cases, analysis module 310 determining the mean voltage drop of the first loop may include analysis module 310 determining a first sum of the first product. In some embodiments, analysis module 310 determining the mean voltage drop of the first loop may include analysis module 310 determining a second sum of the number of non-switching instances of the first loop experiencing a voltage drop of the first voltage. In some embodiments, analysis module 310 determining the mean voltage drop of the first loop may include analysis module 310 dividing the first sum by the second sum.

In some embodiments, analysis module 310 may determine a total current of the first loop by dividing the average power associated with the applied voltage by an applied voltage. In some embodiments, analysis module 310 may determine a die resistance of the first loop by dividing the mean voltage drop of the first loop by the total current of the first loop. In some embodiments, analysis module 310 may determine whether the die resistance of the first loop matches a predetermined static drop range.

In some embodiments, analysis module 310 may determine a mean voltage drop of the second loop. In some embodiments, analysis module 310 determining the mean voltage drop of the second loop may include analysis module 310. In some embodiments, analysis module 310 determining the mean voltage drop of the second loop may include analysis module 310 determining a third sum of the second product. In some embodiments, analysis module 310 determining the mean voltage drop of the second loop may include analysis module 310 determining a fourth sum of the number of non-switching instances of the second loop experiencing a voltage drop of the second voltage. In some embodiments, analysis module 310 determining the mean voltage drop of the second loop may include analysis module 310 dividing the third sum by the fourth sum.

In some embodiments, analysis module 310 may determine a total current of the second loop by dividing the average power associated with the applied voltage by an applied voltage. In some embodiments, analysis module 310 may determine a die resistance of the second loop by dividing the mean voltage drop of the second loop by the total current of the second loop. In some embodiments, analysis module 310 may determine whether the die resistance of the second loop matches a predetermined static drop range.

In one embodiment, validation module 320 may be configured to indicate the die resistance of the first loop is validated upon determining analysis module 310 determines the computed die resistance of the first loop matches the predetermined static drop range. In one embodiment, validation module 320 may indicate the die resistance of the second loop is validated upon determining analysis module 310 determines the computed die resistance of the second loop matches the predetermined static drop range.

Figure 4:
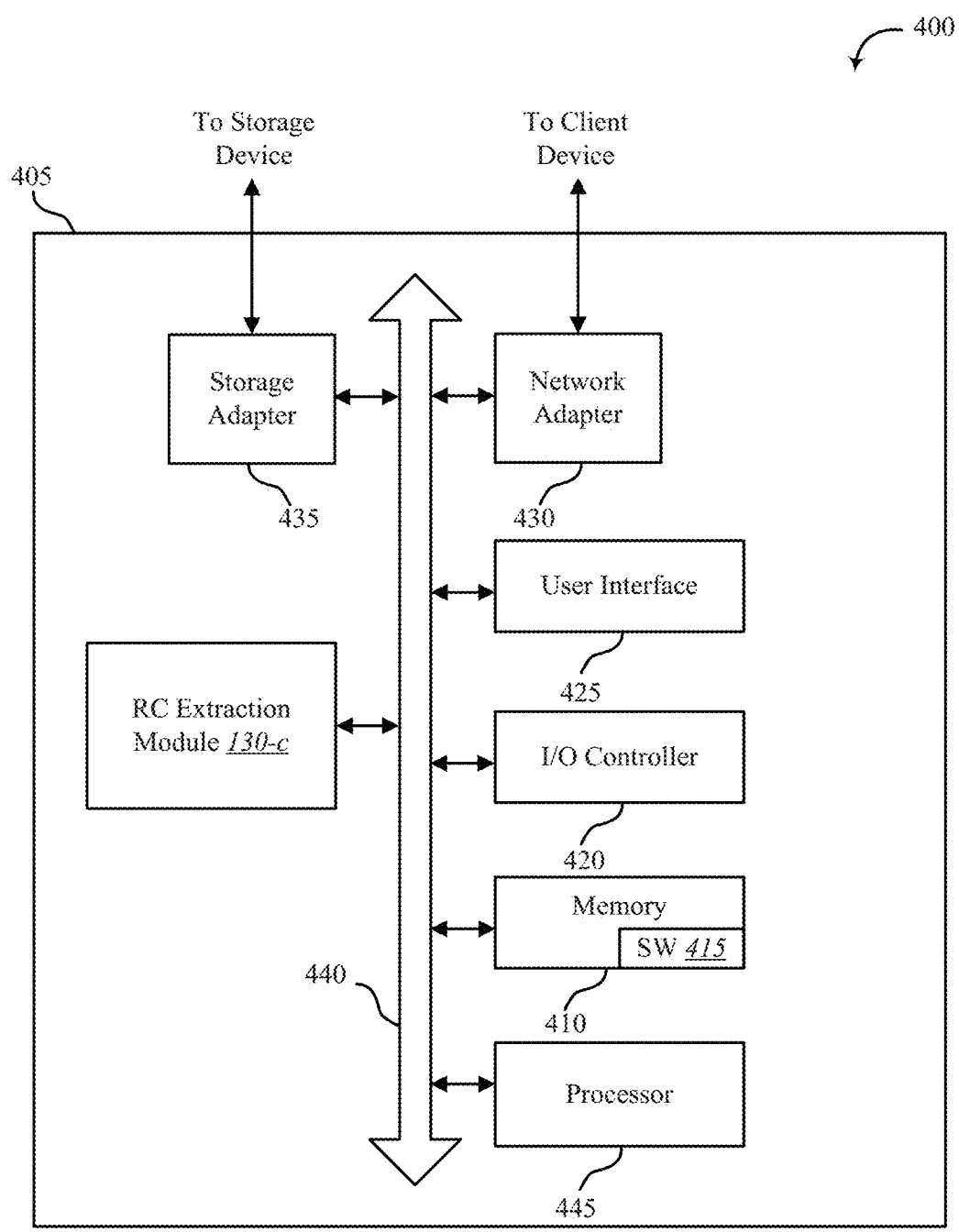
FIG. 4 shows a diagram of a system in accordance with various aspects of this disclosure.

FIG. 4 shows a system 400 for die resistance-capacitance (RC) extraction and validation, in accordance with various examples. System 400 may include an apparatus 405, which may be an example of any one of device 105 of FIG. 1 and/or device 205 of FIG. 2.

Apparatus 405 may include components for bi-directional voice and data communications including components for transmitting communications and components for receiving communications. For example, apparatus 405 may communicate bi-directionally with one or more storage devices and/or client systems. This bi-directional communication may be direct (apparatus 405 communicating directly with a storage system, for example) and/or indirect (apparatus 405 communicating indirectly with a client device through a server, for example).

Apparatus 405 may also include a processor module 445, and memory 410 (including software/firmware code (SW) 415), an input/output controller module 420, a user interface module 425, a network adapter 430, and a storage adapter 435. The software/firmware code 415 may be one example of a software application executing on apparatus 405. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 405 may provide a connection using wireless techniques, including digital cellular telephone connection, Cellular Digital Packet Data (CDPD) connection, digital satellite data connection, and/or another connection. The apparatus 405 may include RC extraction module 130-c, which may perform the functions described above for the RC extraction module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the RC extraction module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 405 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 405 to access one or more data storage devices such as storage device 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
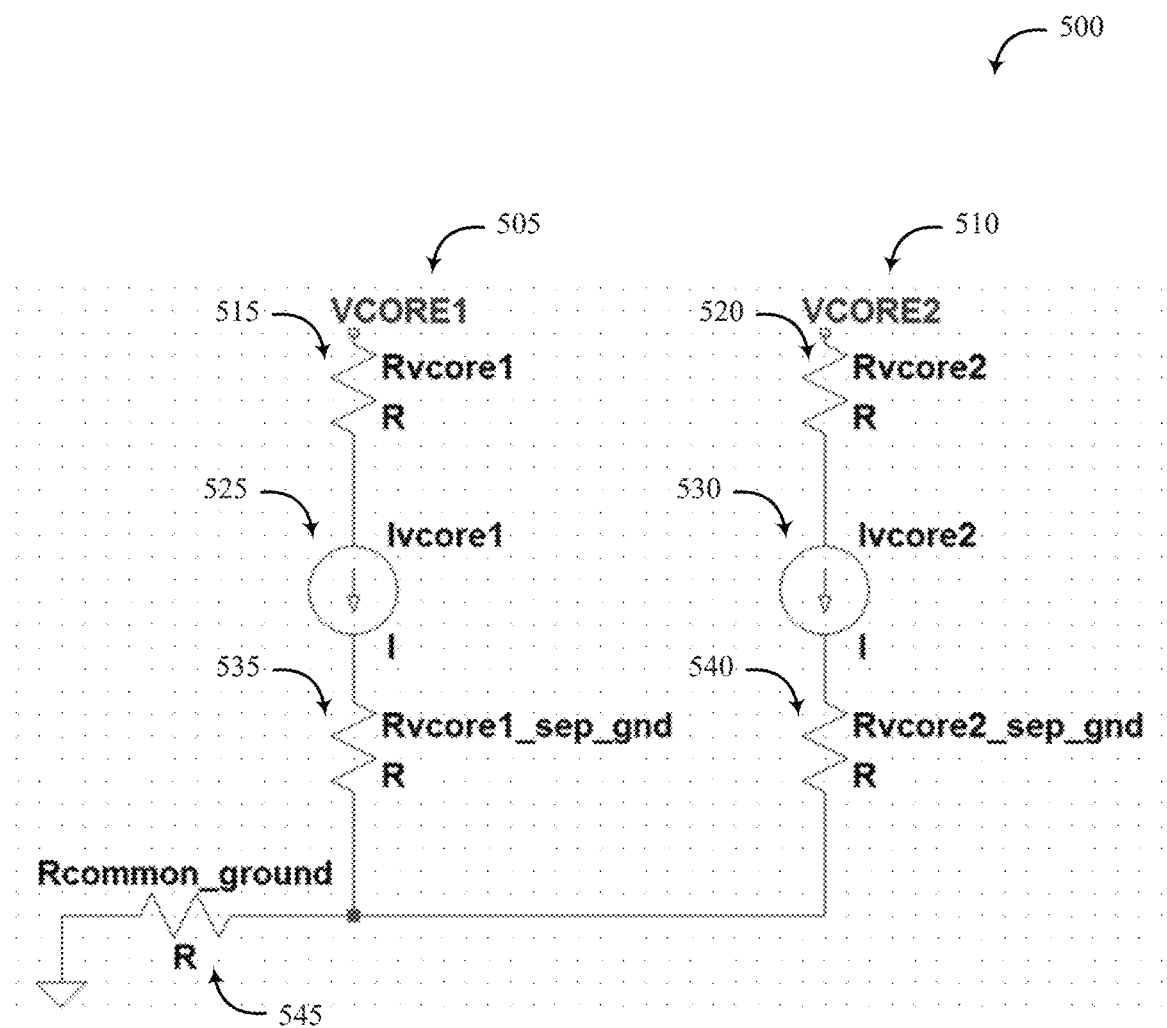
FIG. 5 shows one embodiment of an environment in accordance with various aspects of this disclosure.

FIG. 5 shows an environment 500 for die resistance-capacitance (RC) extraction and validation, in accordance with various examples. At least one aspect of environment 500 may be implemented in conjunction with device 105 of FIG. 1, apparatus 205 of FIG. 2, and/or RC extraction module 130 depicted in FIGS. 1, 2, 3, and/or 4.

In one embodiment, environment 500 depicts a simplified lumped circuit diagram of a real-world IC die for static analysis. As depicted, environment 500 may include first power domain 505 ($V_{Core1}$), and second power domain 510 ($V_{Core2}$). As illustrated, a first power domain resistance 515 ($R_{VCore1}$) may be associated with first power domain 505. Similarly, a second power domain resistance 520 ($R_{VCore2}$) may be associated with second power domain 510. In one embodiment, a first load current 525 ($I_{VCore1}$) may be associated with first power domain 505, and a second load current 530 ($I_{VCore2}$) may be associated with second power domain 510. In some cases, the first load current 525 may be referred to as a current source and/or the second load current 530 may be referred to as a current source. As depicted, a first power domain separate ground resistance 535 ($R_{VCore1\_SEP\_GND}$) may be associated with first power domain 505. Similarly, a second power domain separate ground resistance 540 ($R_{VCore2\_SEP\_GND}$) may be associated second power domain 510. In one embodiment, a common ground resistance 545 ($R_{Common\_Ground}$) may be associated with first power domain 505 and second power domain 510.

Figure 6:
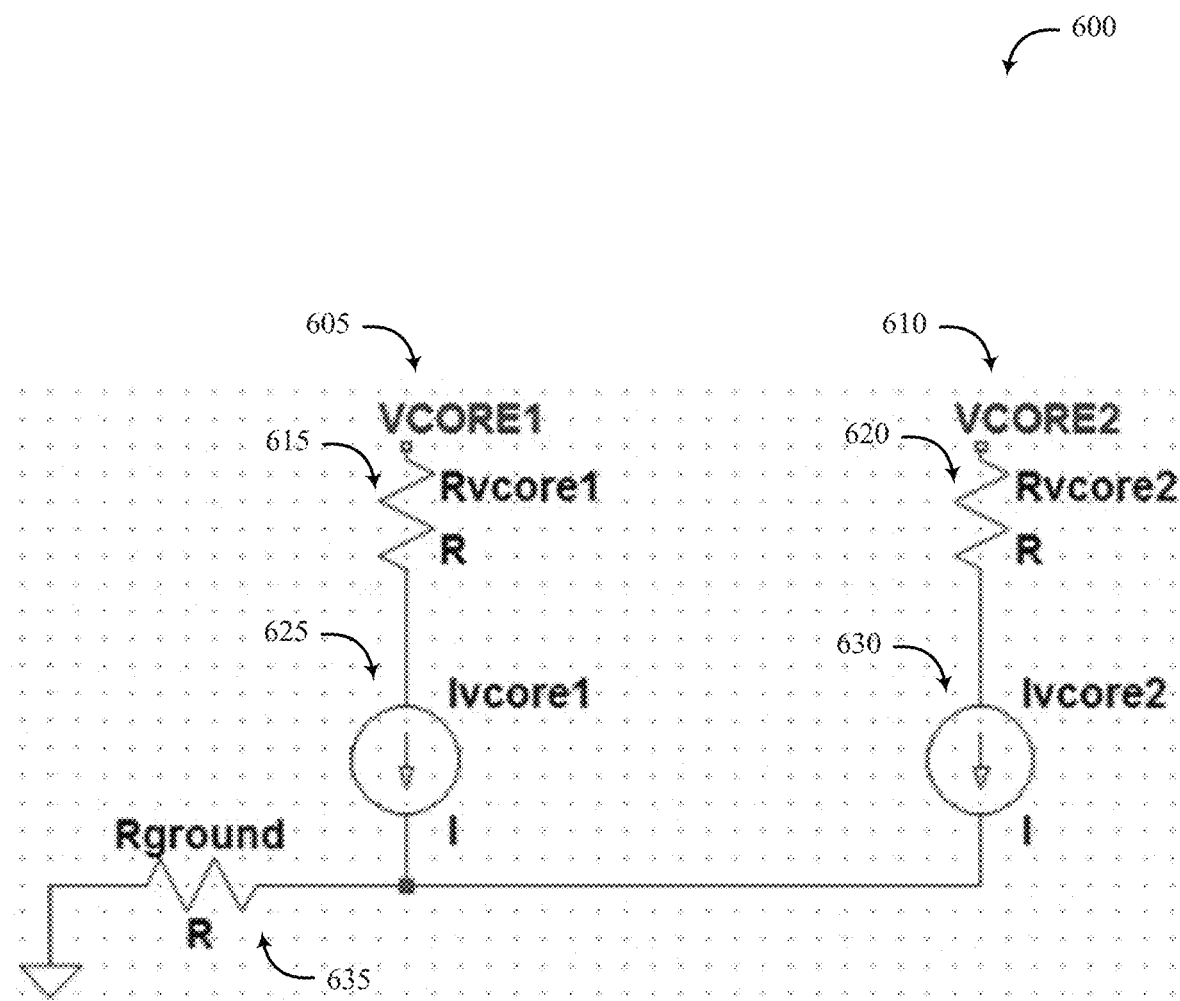
FIG. 6 shows another embodiment of an environment in accordance with various aspects of this disclosure.

FIG. 6 shows an environment 600 for die resistance-capacitance (RC) extraction and validation, in accordance with various examples. Environment 600 may be an example of a model of environment 500 of FIG. 5. At least one aspect of environment 600 may be implemented in conjunction with device 105 of FIG. 1, apparatus 205 of FIG. 2, and/or RC extraction module 130 depicted in FIGS. 1, 2, 3, and/or 4.

In one embodiment, environment 600 depicts a conventional model of a circuit diagram of the IC die of FIG. 5. As depicted, environment 600 may include first power domain 605 ($V_{Core1}$), and second power domain 610 ($V_{Core2}$). As illustrated, a first power domain resistance 615 ($R_{VCore1}$) may be associated with first power domain 605. Similarly, a second power domain resistance 620 ($R_{VCore2}$) may be associated with second power domain 610. In one embodiment, a first load current 625 ($I_{VCore1}$) may be associated with first power domain 605, and a second load current 630 ($I_{VCore2}$) may be associated with second power domain 610. In some cases, the first load current 625 may be referred to as a current source and/or the second load current 630 may be referred to as a current source. In one embodiment, environment 600 as depicted may include ground resistance 635 ($R_{Ground}$). Value of $R_{Ground}$ resistance may be given by equation 1 below.

$$R_{Ground} = R_{Common\_Ground} + (R_{VCore1\_SEP\_GND} \| R_{VCore2\_SEP\_GND}) \quad \text{Eq. 1}$$

Figure 7:
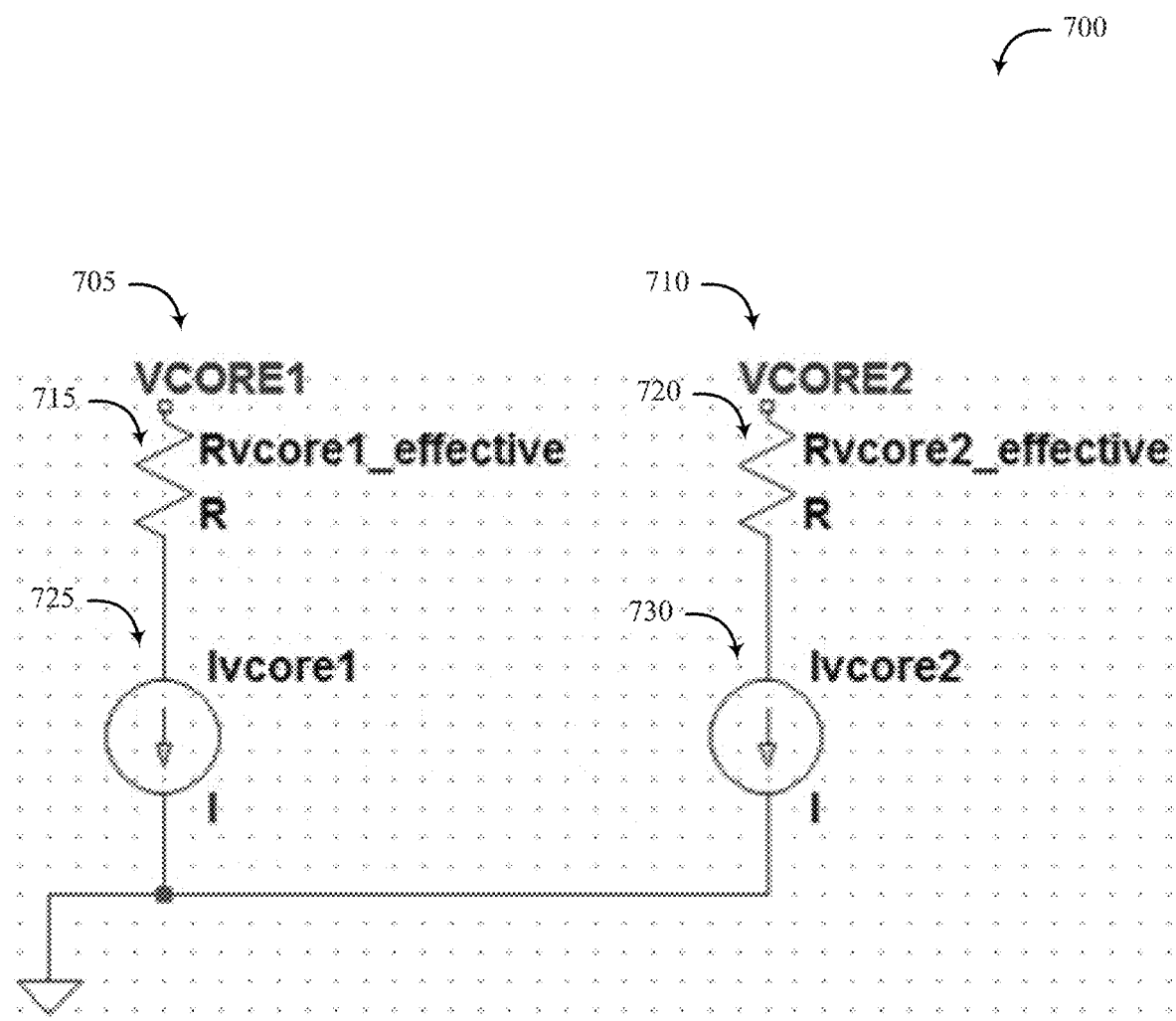
FIG. 7 shows another embodiment of an environment in accordance with various aspects of this disclosure.

FIG. 7 shows an environment 700 for die resistance-capacitance (RC) extraction and validation, in accordance with various examples. Environment 700 may be one example of a model of environment 500 of FIG. 5. At least one aspect of environment 700 may be implemented in conjunction with device 105 of FIG. 1, apparatus 205 of FIG. 2, and/or RC extraction module 130 depicted in FIGS. 1, 2, 3, and/or 4.

In one embodiment, environment 700 depicts a model of the present systems and methods. In one embodiment, the model of environment 700 includes a circuit diagram of the IC die of FIG. 5. As depicted, environment 700 may include first power domain 705 ($V_{CORE1}$), and second power domain 710 ($V_{CORE1}$). As illustrated, first power domain effective resistance 715 ($R_{VCore1\_effective}$) may be associated with first power domain 705. Similarly, second power domain effective resistance 720 ($R_{VCore2\_effective}$) may be associated with second power domain 710. In one embodiment, first load current 725 ($I_{VCore1}$) may be associated with first power domain 705, and second load current 730 ($I_{VCore2}$) may be associated with second power domain 710. In some cases, the first load current 725 may be referred to as a current source and/or the second load current 730 may be referred to as a current source. Values of $R_{VCore1\_effective}$ may be given by equation 2 below.

$$R_{vcore1\_effective} = \{I_{vcore1} * (R_{vcore1} + R_{vcore1\_sep\_gnd} + R_{common\_ground}) + I_{vcore2} * R_{common\_ground}\} / I_{vcore1} \quad \text{Eq. 2}$$

Values of $R_{VCore1\_effective}$ may be given by equation 3 below.

$$R_{vcore2\_effective} = (I_{vcore2} * (R_{vcore2} + R_{vcore2\_sep\_gnd} + R_{common\_ground}) + I_{vcore1} * R_{common\_ground}) / I_{vcore2} \quad \text{Eq. 3}$$

In one embodiment, an actual IC die depicted in FIG. 5 may have certain values. Each of those values may vary from one die circuit implementation to the next. In some embodiments, first power domain resistance 515 ($R_{VCore1}$) may have a value equal to a value of second power domain resistance 520 ($R_{Vcore2}$). Alternatively, first power domain resistance 515 ($R_{VCore1}$) may have a value different from a value of second power domain resistance 520 ($R_{VCore2}$) In some embodiments, first power domain separate ground resistance 535 ($R_{VCore1\_SEP\_GND}$) may have a value equal to a value of to second power domain separate ground resistance 540 ($R_{VCore2\_SEP\_GND}$). Alternatively, first power domain separate ground resistance 535 ($R_{VCore1\_SEP\_GND}$) may have a value different from a value of second power domain separate ground resistance 540 ($R_{VCore2\_SEP\_GND}$). In some embodiments, first load current 525 ($I_{VCore1}$) may have a value equal to a value of second load current 530 ($I_{VCore2}$). Alternatively, first load current 525 ($I_{VCore1}$) may have a value that is different from a value of second load current 530 ($I_{VCore1}$).

As a non-limiting example, first power domain resistance 515 ($R_{VCore1}$) may have a value of 20 milliohms and second power domain resistance 520 ($R_{VCore2}$) may have a value of 20 milliohms. In this example, first power domain separate ground resistance 535 ($R_{VCore1\_SEP\_GND}$) may have a value of 1 milliohm, second power domain separate ground resistance 540 ($R_{VCore2\_SEP\_GND}$) may have a value of 1 milliohm, and common ground resistance 545 ($R_{Common\_Ground}$) may have a value of 1 milliohm. In this example, first load current 525 ($I_{VCore1}$) may have a value of 1 amp, while second load current 530 ($I_{VCore2}$) may have a value of 2 amps. Based on the values of this non-limiting example, the IR drop of first power domain 505 in an actual die circuit may be 24 millivolts (mV), and the IR drop of the second power domain 510 in the actual die circuit may be 45 mV. However, in a conventional model (600) of this actual die circuit, the IR drop of first power domain 505 in an actual die circuit would be 24.5 mV, and the IR drop of the second power domain 510 in the actual die circuit would be 44.5 mV, which fails to match the values of the actual die circuit. Conversely, a model of the actual die circuit based on the present systems and methods (e.g., environment 700 of FIG. 7) with the indicated values of the non-limiting example, the IR drop of first power domain 505 in an actual die circuit would be 24 millivolts (mV), and the IR drop of the second power domain 510 in the actual die circuit would be 45 mV, which succeeds in matching the values of the actual die circuit. Accordingly, the modeling of a die circuit by the present systems and methods provides an improved accuracy in predicting IR drops of modeled die circuits.

Figure 8:
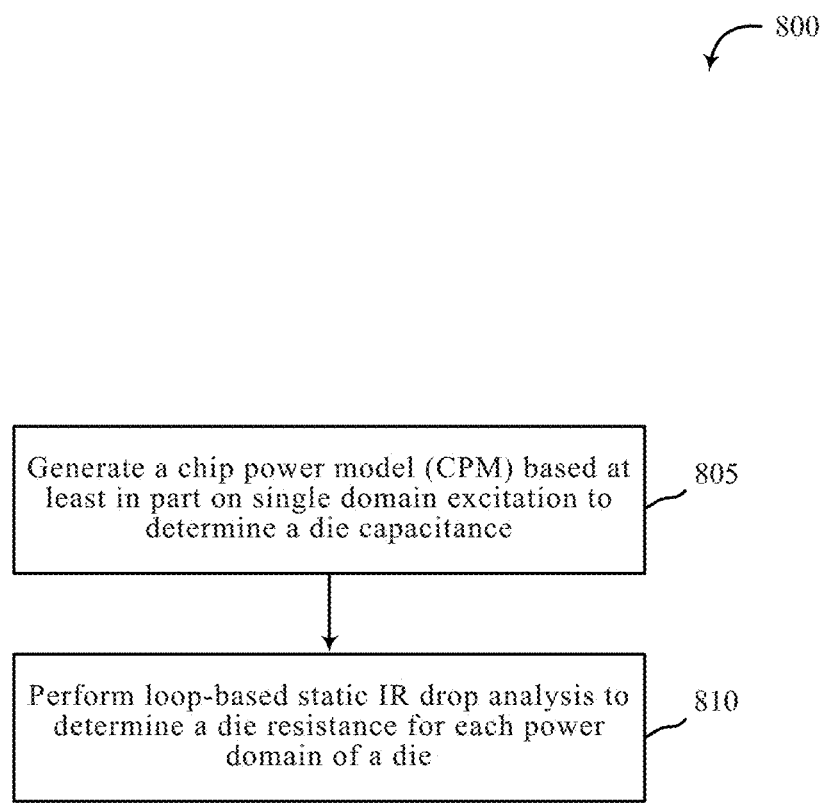
FIG. 8 is a flow chart illustrating an example of a method in accordance with various aspects of this disclosure.

FIG. 8 is a flow chart illustrating an example of a method 800 for die resistance-capacitance (RC) extraction and validation, in accordance with various aspects of the present disclosure. One or more aspects of the method 800 may be implemented in conjunction with device 105 of FIG. 1, apparatus 205 of FIG. 2, and/or RC extraction module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 805, method 800 may include generating a chip power model (CPM) based at least in part on single domain excitation to determine a die capacitance. At block 810, method 800 may include performing loop-based static IR drop analysis to determine a die resistance for each power domain of a die.

The operation(s) at block 805-810 may be performed using the RC extraction module 130 described with reference to FIGS. 1-4 and/or another module. Thus, the method 800 may provide for die resistance-capacitance (RC) extraction and validation. It should be noted that the method 800 is just one implementation and that the operations of the method 800 may be rearranged, omitted, and/or otherwise modified such that other implementations are possible and contemplated.

Figure 9:
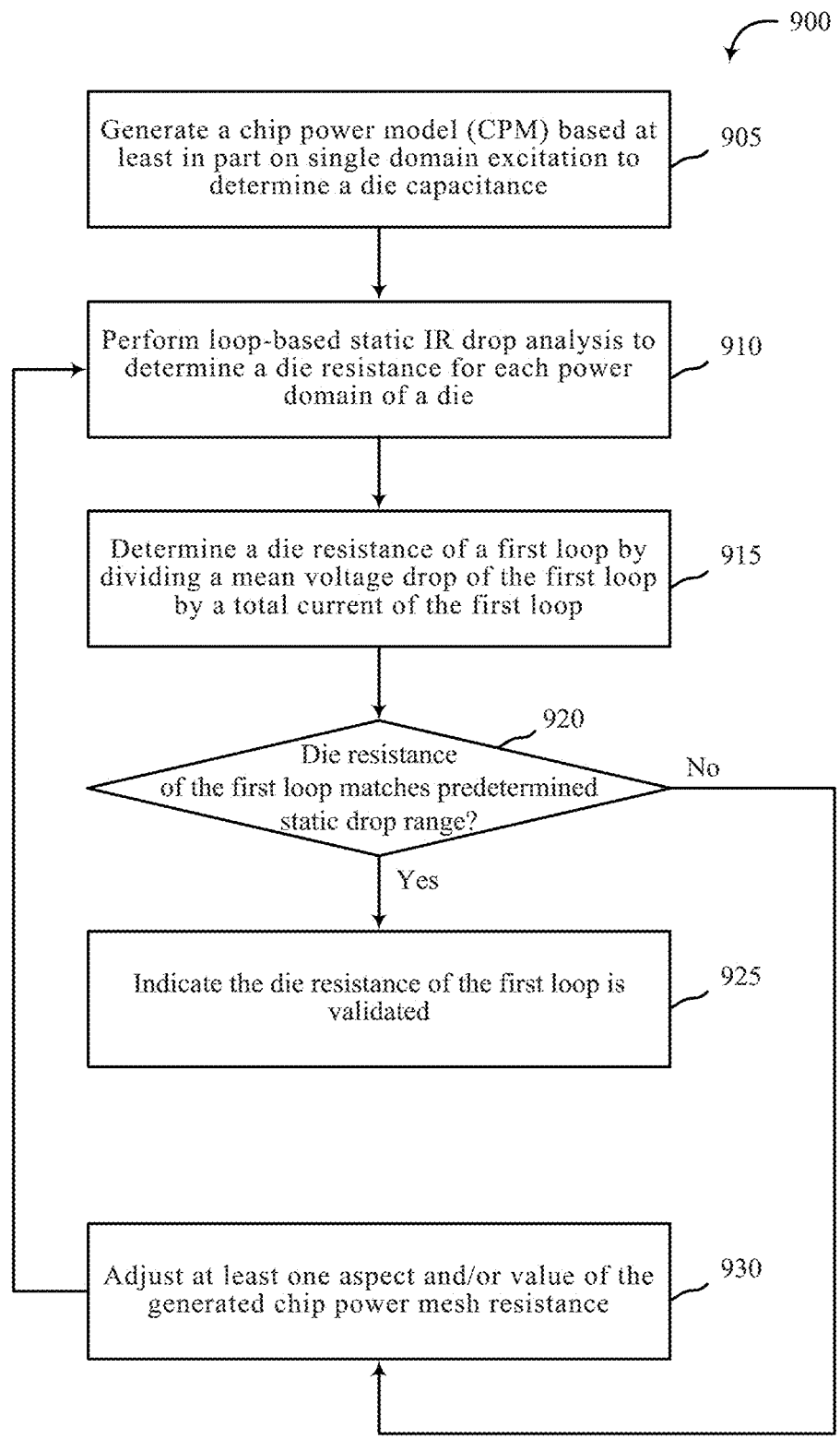
FIG. 9 is a flow chart illustrating an example of a method in accordance with various aspects of this disclosure.

FIG. 9 is a flow chart illustrating an example of a method 900 for die resistance-capacitance (RC) extraction and validation, in accordance with various aspects of the present disclosure. One or more aspects of the method 900 may be implemented in conjunction with device 105 of FIG. 1, apparatus 205 of FIG. 2, and/or RC extraction module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 905, method 900 may include generating a chip power model (CPM) based at least in part on single domain excitation to determine a die capacitance. At block 910, method 900 may include performing loop-based static IR drop analysis to determine a die resistance for each power domain of a die.

At block 915, method 900 may include determining a die resistance of the first loop by dividing the mean voltage drop of the first loop by the total current of the first loop. At block 920, method 900 may include determining whether the die resistance of the first loop matches a predetermined static drop range.

At block 925, upon determining the computed die resistance of the first loop matches the predetermined static drop range, method 900 may include indicating the die resistance of the first loop is validated. At block 930, upon determining the computed die resistance of the first loop fails to match the predetermined static drop range, method 900 may include adjusting at least one aspect and/or value of the chip power mesh resistance. After block 930, method 900 may return to block 910.

The operations at blocks 905-930 may be performed using the RC extraction module 130 described with reference to FIGS. 1-4 and/or another module. Thus, the method 900 may provide for die resistance-capacitance (RC) extraction and validation. It should be noted that the method 900 is just one implementation and that the operations of the method 900 may be rearranged, omitted, and/or otherwise modified such that other implementations are possible and contemplated.

In some examples, aspects from two or more of the methods 800 and 900 may be combined and/or separated. It should be noted that the methods 800 and 900 are just example implementations, and that the operations of the methods 800 and 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:
1. A method for evaluating a die, the method comprising:
   generating a chip power model (CPM) based at least in part on applying a first excitation source between a first power domain of the die and a ground domain of the die;

generating a second CPM based at least in part on applying a second excitation source between a second power domain of the die and the ground domain of the die;

performing loop-based static IR drop analysis to determine a die resistance for the first and second power domains of the die; and determining a die capacitance between at least one of the first and second power domains and the respective first or second ground domain based at least in part on the respective first or second CPM.

2. The method of claim 1, further comprising generating a separate CPM for each power domain of the die.

3. The method of claim 1, wherein the step of determining the die capacitance comprises:
determining a first die capacitance between the first power domain and the ground domain based at least in part on the first CPM; and
determining a second die capacitance between the second power domain and the ground domain based at least in part on the second CPM.

4. The method of claim 3, wherein determining the first die capacitance is based at least in part on performing dynamic analysis of the applying of the first excitation source between the first power domain of the die and the ground domain of the die, and determining the second die capacitance is based at least in part on performing dynamic analysis of the applying of the second excitation source between the second power domain of the die and the ground domain of the die.

5. A method for evaluating a die, the method comprising:
generating a chip power model (CPM) based at least in part on single domain excitation to determine a die capacitance;
applying a voltage to a first loop between a first power domain of the die and a ground domain of the die;
determining how many non-switching instances of the first loop experience a voltage drop of a first voltage value.

6. The method of claim 5, further comprising:
applying the voltage to a second loop between a second power domain of the die and the ground domain of the die; and
determining how many non-switching instances of the second loop experience a voltage drop of a second voltage value.

7. The method of claim 6, further comprising:
determining a first product of the number of non-switching instances of the first loop experiencing a voltage drop of the first voltage value multiplied by the respective first voltage drop values.

8. The method of claim 7, further comprising:
determining a mean voltage drop of the first loop by determining a first sum of the first product, determining a second sum of the number of non-switching instances of the first loop experiencing a voltage drop of the first voltage, and dividing the first sum by the second sum.

9. The method of claim 8, further comprising:
determining a total current of the first loop by dividing the average power associated with the applied voltage by an applied voltage.

10. The method of claim 9, further comprising:
determining a die resistance of the first loop by dividing the mean voltage drop of the first loop by the total current of the first loop.

11. The method of claim 10, further comprising:
determining whether the die resistance of the first loop matches a predetermined static drop range; and
upon determining the computed die resistance of the first loop matches the predetermined static drop range, indicating the die resistance of the first loop is validated.

12. The method of claim 6, further comprising:
determining a second product of the number of non-switching instances of the second loop experiencing a voltage drop of the second voltage value multiplied by the respective second voltage drop values.

13. The method of claim 12, further comprising:
determining a mean voltage drop of the second loop by determining a third sum of the second product, determining a fourth sum of the number of non-switching instances of the second loop experiencing a voltage drop of the second voltage, and dividing the third sum by the fourth sum.

14. The method of claim 13, further comprising:
determining a total current of the second loop by dividing the average power associated with the applied voltage by an applied voltage.

15. The method of claim 14, further comprising:
determining a die resistance of the second loop by dividing the mean voltage drop of the second loop by the total current of the second loop.

16. The method of claim 15, further comprising:
determining whether the die resistance of the second loop matches a predetermined static drop range; and
upon determining the computed die resistance of the second loop matches the predetermined static drop range, indicating the die resistance of the second loop is validated.

17. An apparatus for die resistance-capacitance (RC) extraction and validation, the apparatus comprising:
one or more processors;
memory in electronic communication with the one or more processors; and
instructions stored in the memory, the instructions being executable by the one or more processors to perform the steps of:
generating a chip power model (CPM) based at least in part on applying a first excitation source between a first power domain of the die and a ground domain of the die;
generating a second CPM based at least in part on applying a second excitation source between a second power domain of the die and the ground domain of the die;
performing loop-based static IR drop analysis to determine a die resistance for the first and second power domains of the die; and
determining a die capacitance between at least one of the first and second power domains and the respective first or second ground domain based at least in part on the respective first or second CPM.

18. The apparatus of claim 17, wherein the one or more processors also perform generating a separate CPM for each power domain of the die.

19. A computer-program product for die resistance-capacitance (RC) extraction and validation, the computer-program product comprising a non-transitory computer-readable medium storing instructions thereon, the instructions being executable by a processor to perform the steps of:

generating a chip power model (CPM) based at least in part on applying a first excitation source between a first power domain of the die and a ground domain of the die;

generating a second CPM based at least in part on applying a second excitation source between a second power domain of the die and the ground domain of the die;

performing loop-based static IR drop analysis to determine a die resistance for the first and second power domains of the die; and determining a die capacitance between at least one of the first and second power domains and the respective first or second ground domain based at least in part on the respective first or second CPM.

20. The computer program product of claim 19, wherein the instructions are also executable for generating a separate CPM for each power domain of the die.

* * * * *